United States Patent [19]
Muller et al.

[11] Patent Number: 5,851,340
[45] Date of Patent: Dec. 22, 1998

[54] PROCESS FOR FASTENING CONDUCTIVE BARS

[75] Inventors: Franz Muller, Grambuch; Gunther Mussbacher, Kumberg, both of Austria

[73] Assignee: Elin Energieversorgung GmbH, Vienna, Austria

[21] Appl. No.: 737,600

[22] PCT Filed: May 23, 1995

[86] PCT No.: PCT/AT95/00098

§ 371 Date: Nov. 25, 1996

§ 102(e) Date: Nov. 25, 1996

[87] PCT Pub. No.: WO95/32540

PCT Pub. Date: Nov. 30, 1995

[30] Foreign Application Priority Data

May 24, 1994 [AU] Australia .............................. A1052/94

[51] Int. Cl.$^6$ .............................. H02K 3/48; H02K 3/40
[52] U.S. Cl. .......................... 156/293; 156/295; 310/204; 310/214; 310/215
[58] Field of Search ................................. 156/295, 293; 310/215, 214, 201; 29/596, 598

[56] References Cited

U.S. PATENT DOCUMENTS

| | | |
|---|---|---|
| 3,444,407 | 5/1969 | Yates et al. .............................. 310/215 |
| 4,068,691 | 1/1978 | Lonseth et al. . |
| 4,095,627 | 6/1978 | Lonseth et al. . |
| 4,110,900 | 9/1978 | Lonseth et al. . |
| 4,112,041 | 9/1978 | Lonseth et al. . |
| 4,369,389 | 1/1983 | Lambrecht .......................... 310/215 X |

FOREIGN PATENT DOCUMENTS

| | | |
|---|---|---|
| 1164562 | 3/1959 | Germany . |
| 3510943 | 10/1985 | Germany . |
| 4025439 | 2/1992 | Germany . |
| 1252137 | 10/1989 | Japan ..................................... 310/215 |
| 4197056 | 7/1992 | Japan ..................................... 310/215 |

*Primary Examiner*—Jeff H. Aftergut
*Attorney, Agent, or Firm*—Greenblum & Bernstein, P.L.C.

[57] ABSTRACT

A process is disclosed for fastening windings in a permanent and reliable manner without reducing the cooling cross-sections. Doses of an electroconductive elastomer are introduced for that purpose approximately in the middle of the partial bundle of lamination, on the top of the bar and/or on intermediate pieces. The elastomer material (9) is pushed upwards when the bottom bars (3) are pressed in or flows towards the middle of the conductive bar when the intermediate pieces (7) are laid in. No elastomer flows into the core ducts (10) of the partial bundles of laminations (11), so that the cooling cross-section is not narrowed. It thus becomes possible for the first time to glue the winding to the bundle of laminations in an elastic and stress-free manner. The main advantage however is that the dosed introduction of elastomer does not reduce the core ducts nor their cross-section.

15 Claims, 3 Drawing Sheets

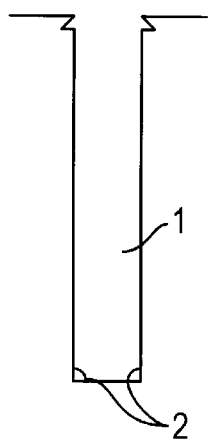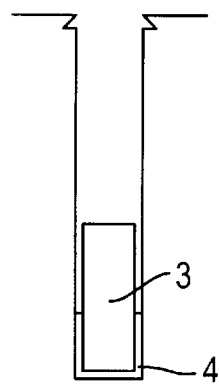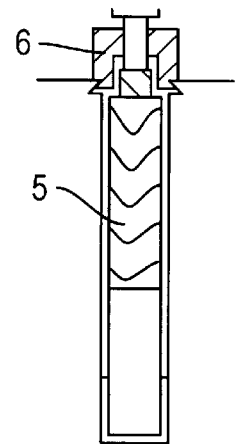
FIG. 1a        FIG. 1b        FIG. 1c
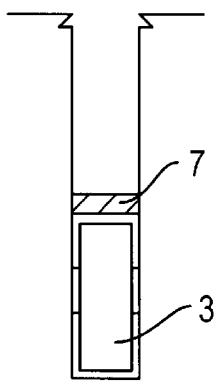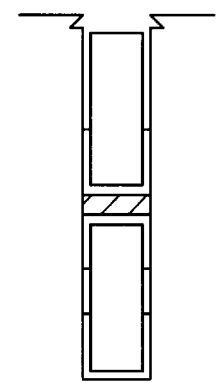
FIG. 1d        FIG. 1e
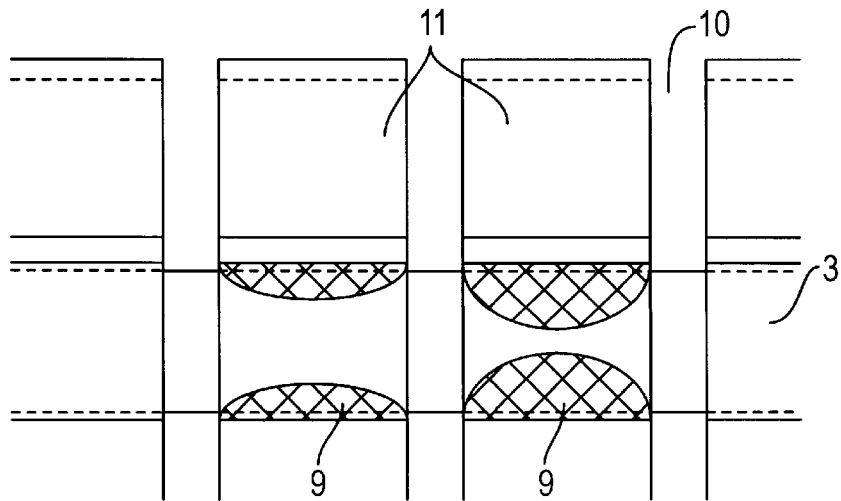
FIG. 2

PROCESS FOR FASTENING CONDUCTIVE BARS

BACKGROUND OF THE INVENTION

1. Field of the Invention

This invention relates to a process for fastening conductive bars, in particular, high-voltage windings used in electrical equipment, in the slots of the bundles of laminations, preferably provided with core ducts. The conductive bars are glued with an electro-conductive cross-linked polymer, while the polymer, which is not cross-linked, is laid into the slot in the form of soft material, the conductive bar is imbedded into the polymer which is not cross-linked, the polymer is supplemented at the bar side pointing towards the slot opening, and the conductive bar is fixed until the polymer is cross-linked.

2. Background of the Invention and Related Art

A similar process is known from AT-PS 386,705. In practice, it has been proven that this process guarantees an effective method of fastening conductive bars. It has, however, a certain disadvantage in that the polymer material flows into the core ducts as a result of introducing an uncontrolled polymer material. A reduction of the cooling cross-section is the consequence, which may result in unacceptable heat build-up.

For the sake of order, however, it must be pointed out that this method of fastening does not replace a corona grading. As is generally known, an effective corona grading presupposes that the protective sleeve at the surface is completely wetted. Otherwise, partial discharges would occur in fault positions. To prevent this, the corona grading layer, for example, a silicone rubber, must be applied without gaps together with a carrier material during production prior to inserting the bar into the sleeve.

The aforementioned fastening method of the conductive bar cannot replace the corona grading by any means due to the characteristics of the method of fastening.

A corona grading configuration is also known from DE-PS 1164562 in which a rather costly imbedding of the conductive bar into a rigid filling material between two separating foils is used as a method of fastening. This enables the bar to perform a sliding motion in the axial direction.

SUMMARY OF THE INVENTION

Further, a device is know from U.S. Pat. No. 4,068,691, by means of which, with the winding being inserted, an elastomer may be introduced to the core duct. The wetting of the elastomer takes place laterally between the top of the bar and the slot wall. This form of attachment may result in loosening in the wedge area.

In view of the foregoing, it is an object of the present invention to provide a process of the aforementioned type by means of which the winding is fastened permanently and securely or to prevent said winding from dropping when used in vertically mounted machines.

The inventive process is characterized by the fact that an electro-conductive elastomer is used as polymer, and that the elastomer is introduced approximately in the middle of the partial bundle of laminations at the bottom of the slot and/or on the top of the bar and/or on the intermediate piece, while the elastomer is distributed by pressing in the conductive bar and/or the intermediate bar and/or, if necessary, the slot wedge, so that a predominantly enclosed elastomer layer is produced at the bottom of the slot or at the parallel surface of the bottom of the slot, and the elastomer layer expands at the slot flanks.

It thus becomes possible for the first time to glue the winding to the bundle of laminations in an elastic and stress-free manner. Further, an improved heat dissipation—compared with the conventional wedging out method—from the conductive bar to the bundle of laminations is provided.

The main advantage, however, is that the dosed introduction of elastomer does not reduce the core ducts nor their cross-section.

Exact dosages can be determined mathematically. However, results were also recorded by applying the empirical method to a sampling. There was no indication of elastomer penetrating the core duct.

For the sake of order, the inventive process steps are listed:

The elastomer is introduced into the slot by means of a dosing device which may be a spray gun with injection nozzle. The diameter of the injection nozzle is adjusted to the slot width and is provided with two outlets.

The elastomer is introduced into the middle of the partial bundle of laminations into the prepared slots by means of a dosing device. Thus, the elastomer is placed in the form of drops into each edge of the bottom of the slot and slot flank through the outlets of the dosing device.

The bottom bars are pressed into the slots in such a way that the elastomer is distributed at the bottom of the slot and partially at the slot flanks, but is not pressed into the core ducts. The pressing into conductive bars, however, does not require balanced centering or special spacings.

At the bottom of the slot, or in another process step at the surfaces parallel to the bottom of the slot, this will result in a predominantly enclosed elastomer layer, while the elastomer layer at the slot flanks expands in the form of a semi-circle.

By means of the processed clamping bars and holding fixtures, the bottom bar is temporarily fixed until the glued joint has adequately solidified.

Following the removal of the clamping bars, the elastomer is introduced at the bottom bars like at the bottom of the slot, and the intermediate piece is inserted.

The top bars are fastened in a similar manner as the bottom bars. However, the slot wedge is inserted prior to dosing the elastomer onto the surface of the top bar which is provided with slot openings.

The slot wedge is injection-molded and has a fire-retarding, fiberglass-reinforced design. According to a special development of the invention, the center of the slot wedge is provided at the center with a bore hole through which the elastomer is introduced under pressure by means of a needle dosing device. It preferably is pressed in at 6 bar, until the elastomer becomes visible in the core duct area.

This is followed by the complete cross-linking of the elastomer.

According to a special feature of the invention, this process is predestined for high-efficiency machines, which are provided with narrow and high partial bundles of lamination. According to the inventive development, the core ducts between the partial bundles of lamination are provided with core duct covers.

This inventive process is used, in particular, with turbo-generators.

When using high bars, only a negligible cross-linking height is achieved with the slot flanks, when using the above-described method.

A negligible cross-linking height, however, means poor heat dissipation from the conductive bar into the bundle of laminations. Under normal circumstances, this would simply call for increased elastomer dosing. However, this would result in an elastomer penetration into the core ducts and consequently in a reduction in the air cooling cross-section.

According to the invention, the core duct is provided with a core duct cover. According to the inventive development, the core duct cover is made from injection-molded plastic.

While the cooling effect in the core duct is negligibly lower as a result of covering the core duct, continuous complete wetting of the conductive bar provides an excellent heat transfer from bar surface to bundle of laminations. The improved heat transfer largely balances the reduced cooling effect, so that overall a higher heat dissipation is achieved.

In contrast to the initially described process, when using core duct covers the elastomer is not dosed quasi drop-by-drop, but a precisely dosed continuous strand of elastomer is laid into the edge of the bottom of the slot and into the slot flank.

BRIEF DESCRIPTION OF THE DRAWINGS

The invention is explained in detail by means of embodiments which are shown in the drawings. FIGS. 1a through 1e show the first process steps, FIG. 2 the expanding elastomer layer, FIG. 3 the pressing in of elastomer material by means of the needle dosing device, and FIG. 4 the fastening of a conductive bar of a turbogenerator.

DETAILED DESCRIPTION OF THE PREFERRED EMBODIMENTS OF THE INVENTION

Figure 3:
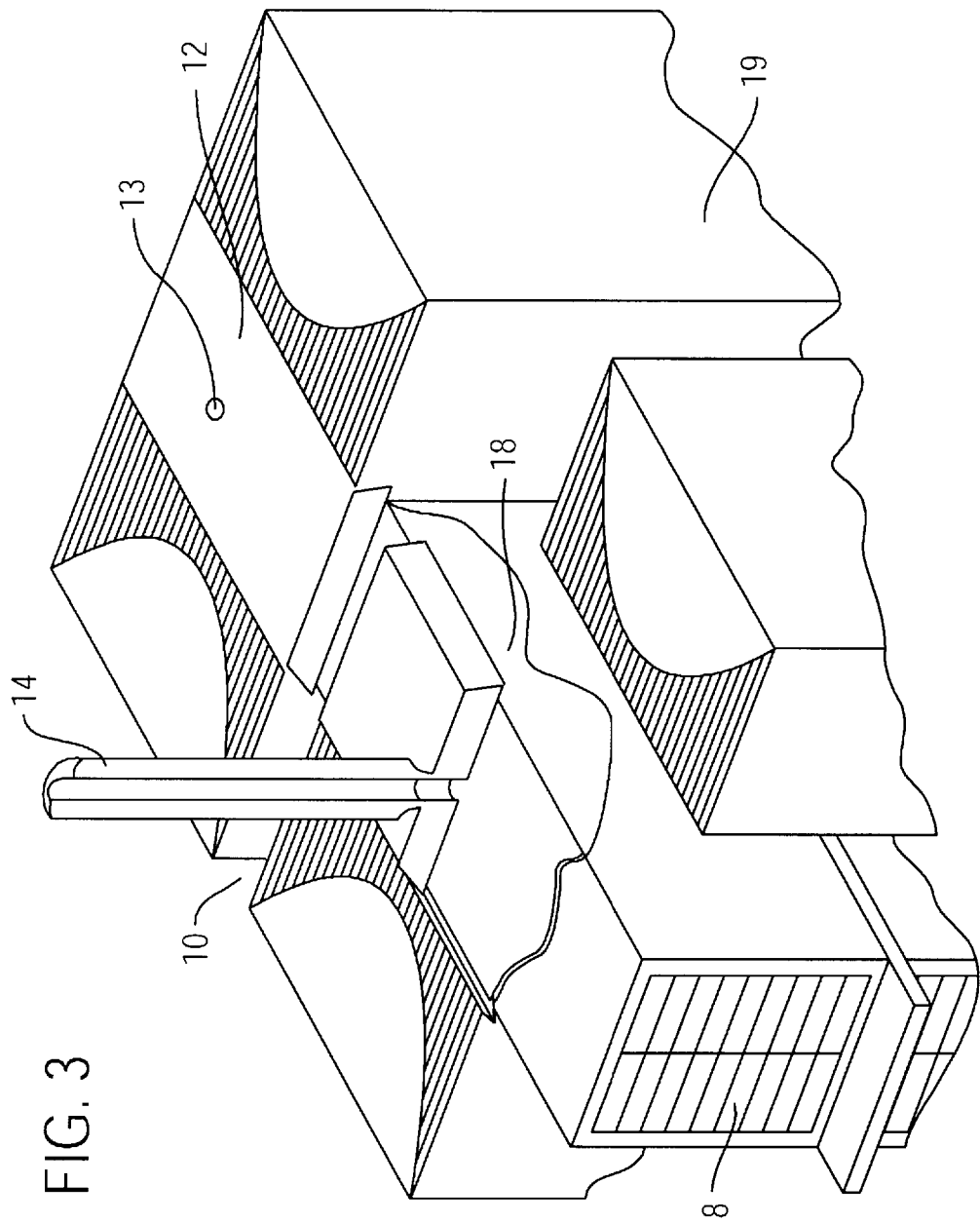

According to FIG. 1a, two exactly dosed elastomer materials 2 are introduced drop-by-drop into the middle of the partial bundle of laminations in slot 1 by means of the dosing device. By pressing in the bottom bar 3, the elastomer material is distributed at the bottom of the slot and forms an enclosed layer 4, or the elastomer layer pushes upward along the slot flanks (FIG. 1b). By means of the processed clamping bars 5 (FIG. 1c) and the holding fixtures 6, the bottom bar 3 is temporarily fixed, i.e., until the glued joint between the bottom bar 3 and the slot 1 have adequately solidified. Following the binding and checking of the bottom bars 3, the holding fixtures 6 and the clamping bars 5 are removed. Like in the bottom of the slot, the same amount of elastomer is laid onto the bottom bars 3 by means of the dosing device, and the intermediate piece 7 is inserted (FIG. 1d). The top bars 8 are fastened in the same manner as the bottom bars (FIG. 1e).

For the sake of completeness, it should be mentioned that with processes considered to be part of the prior art, following insertion of the top bars an additional drop of elastomer is deposited on the top by means of a small nozzle, and then the chafing strip is applied.

As is shown in FIG. 2, the elastomer material 9 pushes upward to the surface when pressing upon the bottom bars 3, or, when introducing the intermediate pieces 7, the elastomer material flows in the direction of the center of the conductive bar. No elastomer flows into the core ducts 10 of the partial bundle of laminations 11. This will not result in a narrowing of the cooling cross-section.

FIG. 3 shows the final process step. After introducing the top bar into the bundle of laminations 19, the slot wedge 12 is inserted. The slot wedge 12 is provided at the center with a bore hole 13. The elastomer material 18 is pressed onto the surface of the top bar 8 by means of a needle dosing device 14. This process is concluded when there are indications that the elastomer becomes visible in the area of the core duct 10. This is followed by the complete cross-linking of elastomer.

Figure 4:
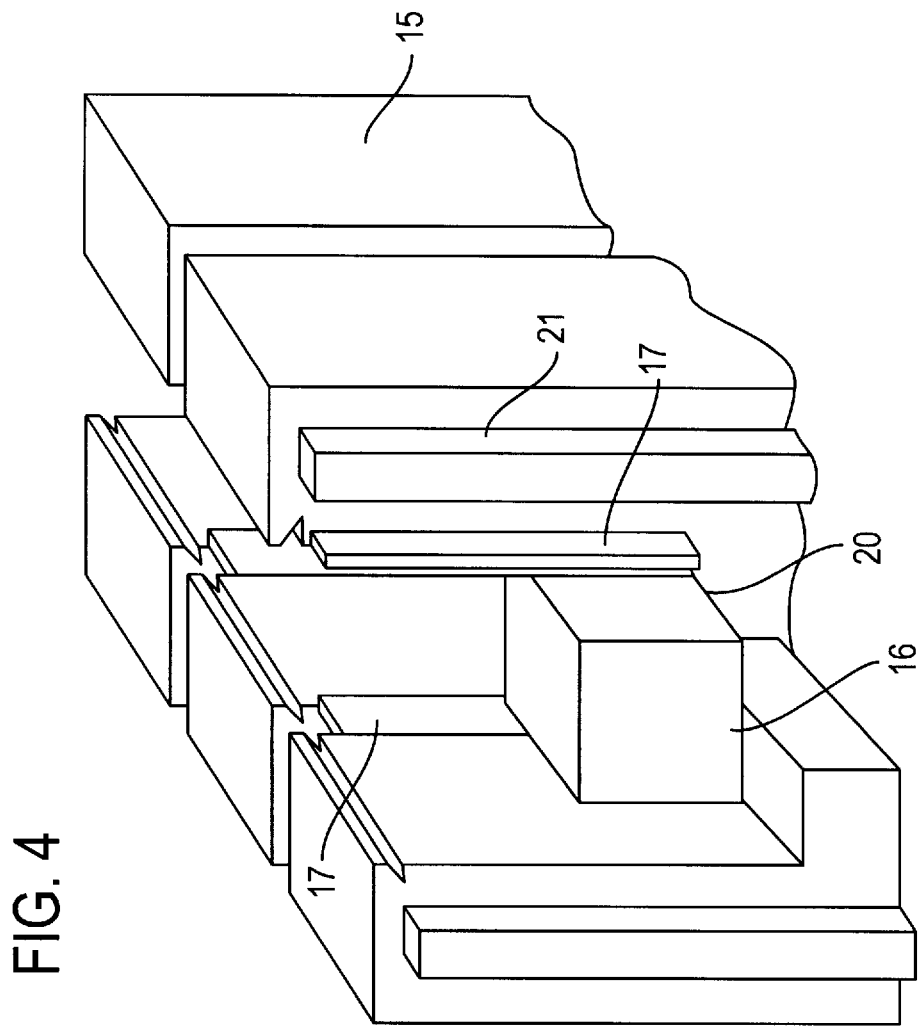

FIG. 4 shows a partial bundle of laminations used in turbogenerators. The partial bundles 15 of such laminations have an unfavorable bundle-width-to-slot-height ratio. As mentioned above, the previously shown method of fastening conductive bars would produce poor heat transfer from the conductive bar 16. In order to create an adequate heat transfer, core duct covers 17 are provided. The core duct covers 17 hardly reduce the cooling cross-section. Fan ribs 21 penetrate the cooling cross-section. By attaching the core duct covers 17, an elastomer strand may be dosed onto the corners of the bottom of the slot and the slot flank and their corresponding corners. By introducing the larger volume of elastomer material, a much larger gluing surface 20 is produced between the conductive bar 16 and the slot, so that this also produces an excellent heat transfer from the conductive bar 16 and the bundle of laminations. The better heat transfer decidedly outweighs the reduction in the cooling cross-section, resulting from the core duct cover 17.

What is claimed is:

1. A process for fastening conductive bars in slots of bundles of laminations provided with core ducts, comprising:

applying an electro-conductive polymer as a soft material which is not cross-linked into a bottom of a corresponding slot in a middle of a partial bundle of laminations, said electro-conductive polymer comprising an elastomer;

embedding a conductive bar into the polymer which is not cross-linked and distributing the elastomer by pressing in the conductive bar so that a predominantly enclosed elastomer layer is produced at the bottom of the slot with the elastomer layer expanding at slot flanks; and providing core duct covers on the core ducts between partial bundles of laminations.

2. The process according to claim 1, wherein the core duct cover is composed of injection-molded plastic.

3. The process according to claim 2, wherein the bundles of laminations comprise high-voltage windings used in electrical equipment.

4. The process according to claim 1, wherein the bundles of laminations comprise high-voltage windings used in electrical equipment.

5. A process for fastening conductive bars in slots of bundles of laminations provided with core ducts, comprising:

applying an electro-conductive polymer comprising an elastomer as a soft material which is not cross-linked into a bottom of a corresponding slot in a middle of a partial bundle of laminations by introducing the elastomer under pressure with a needle dosing device through a bore hole in a slot wedge at a central portion of the slot; and embedding a conductive bar into the polymer which is not cross-linked and distributing the elastomer by pressing in the conductive bar so that a predominantly enclosed elastomer layer is produced at the bottom of the slot with the elastomer layer expanding at slot flanks.

6. The process according to claim 5, wherein the bundles of laminations comprise high-voltage windings used in electrical equipment.

7. A process for fastening conductive bars in slots of bundles of laminations provided with core ducts, comprising:

applying an electro-conductive polymer comprising an elastomer as a soft material which is not cross-linked into a bottom of a corresponding slot in a middle of a partial bundle of laminations by introducing the elastomer under pressure with a needle dosing device through a bore hole in a slot wedge at a central portion of the slot;

embedding a conductive bar into the polymer which is not cross-linked and distributing the elastomer by pressing in the conductive bar so that a predominantly enclosed elastomer layer is produced at the bottom of the slot with the elastomer layer expanding at slot flanks; and the conductive bar including a top portion, and further comprising applying an electroconductive elastomer as a soft material which is not cross-linked onto the top of the conductive bar; pressing in an intermediate bar so that a predominantly enclosed elastomer layer is produced that is substantially parallel to the bottom of the slot with the elastomer layer expanding at slot flanks.

8. The process according to claim 7, wherein the intermediate bar has a top portion, and further comprising applying an electro-conductive elastomer as a soft material which is not cross-linked onto the top of the intermediate bar; pressing in a top conductive bar so that a predominantly enclosed elastomer layer is produced that is substantially parallel to the bottom of the slot with the elastomer layer expanding at slot flanks.

9. The process according to claim 7, wherein the bundles of laminations comprise high-voltage windings used in electrical equipment.

10. A process for fastening conductive bars in slots of bundles of laminations provided with core ducts, comprising:

applying an electro-conductive polymer as a soft material which is not cross-linked into a bottom of a corresponding slot in a middle of a partial bundle of laminations, said electro-conductive polymer comprising an elastomer;

embedding a conductive bar into the polymer which is not cross-linked and distributing the elastomer by pressing in the conductive bar so that a predominantly enclosed elastomer layer is produced at the bottom of the slot with the elastomer layer expanding at slot flanks;

the conductive bar including a top portion, and further comprising applying an electroconductive elastomer as a soft material which is not cross-linked onto the top of the conductive bar; pressing in an intermediate bar so that a predominantly enclosed elastomer layer is produced that is substantially parallel to the bottom of the slot with the elastomer layer expanding at slot flanks; and providing core duct covers on the core ducts between partial bundles of laminations.

11. The process according to claim 10, wherein the core duct cover is composed of injection-molded plastic.

12. The process according to claim 10, wherein the bundles of laminations comprise high-voltage windings used in electrical equipment.

13. A process for fastening conductive bars in slots of bundles of laminations provided with core ducts, comprising:

applying an electro-conductive polymer as a soft material which is not cross-linked into a bottom of a corresponding slot in a middle of a partial bundle of laminations, said electro-conductive polymer comprising an elastomer;

embedding a conductive bar into the polymer which is not cross-linked and distributing the elastomer by pressing in the conductive bar so that a predominantly enclosed elastomer layer is produced at the bottom of the slot with the elastomer layer expanding at slot flanks;

the conductive bar including a top portion, and further comprising applying an electroconductive elastomer as a soft material which is not cross-linked onto the top of the conductive bar; pressing in an intermediate bar so that a predominantly enclosed elastomer layer is produced that is substantially parallel to the bottom of the slot with the elastomer layer expanding at slot flanks;

the intermediate bar including a top portion, and further comprising applying an electroconductive elastomer as a soft material which is not cross-linked onto the top of the intermediate bar; pressing in a top conductive bar so that a predominantly enclosed elastomer layer is produced that is substantially parallel to the bottom of the slot with the elastomer layer expanding at slot flanks; and providing core duct covers on the core ducts between partial bundles of laminations.

14. The process according to claim 13, wherein the core duct cover is composed of injection-molded plastic.

15. A process for fastening conductive bars in slots of bundles of laminations provided with core ducts, comprising:

applying an electro-conductive polymer as a soft material which is not cross-linked into a bottom of a corresponding slot in a middle of a partial bundle of laminations through a bore hole in a slot wedge at a central portion of the slot, said electro-conductive polymer comprising an elastomer; and embedding a conductive bar into the polymer which is not cross-linked and distributing the elastomer by pressing in the conductive bar so that a predominantly enclosed elastomer layer is produced at the bottom of the slot with the elastomer layer expanding at slot flanks.

* * * * *